(12) United States Patent
Schneider et al.

(10) Patent No.: US 7,963,549 B2
(45) Date of Patent: Jun. 21, 2011

(54) INFLATABLE AIRBAG CUSHION ASSEMBLIES WITH MODIFIED THROAT PORTIONS

(75) Inventors: David W. Schneider, Waterford, MI (US); Timothy A. DePottey, Flint, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/417,357

(22) Filed: Apr. 2, 2009

(65) Prior Publication Data
US 2010/0253055 A1 Oct. 7, 2010

(51) Int. Cl.
B60R 21/20 (2011.01)
(52) U.S. Cl. .................. 280/728.2; 280/730.2
(58) Field of Classification Search ............. 280/728.2, 280/730.2, 743.1, 736, 740, 742
See application file for complete search history.

(56) References Cited

U.S. PATENT DOCUMENTS

| | | | |
|---|---|---|---|
| 5,092,628 A * | 3/1992 | Tamura et al. | 280/731 |
| 5,944,342 A * | 8/1999 | White et al. | 280/729 |
| 6,082,761 A | 7/2000 | Kato et al. | |
| 6,224,089 B1 | 5/2001 | Uchiyama et al. | |
| 6,260,878 B1 | 7/2001 | Tanase | |
| 6,279,944 B1 * | 8/2001 | Wipasuramonton et al. | 280/730.2 |
| 6,293,581 B1 | 9/2001 | Saita et al. | |
| 6,447,003 B1 * | 9/2002 | Wallentin et al. | 280/728.2 |
| 6,450,529 B1 | 9/2002 | Kalandek et al. | |
| 6,497,429 B2 | 12/2002 | Matsumoto | |
| 6,749,216 B2 | 6/2004 | Tanase et al. | |
| 6,783,148 B2 | 8/2004 | Henderson | |
| 6,805,374 B2 * | 10/2004 | Saderholm et al. | 280/730.2 |
| 6,811,184 B2 | 11/2004 | Ikeda et al. | |
| 6,860,506 B2 | 3/2005 | Ogata et al. | |
| 6,866,292 B2 | 3/2005 | Thomas | |
| 7,090,243 B2 | 8/2006 | Igawa | |
| 7,140,639 B2 | 11/2006 | Hayashi et al. | |
| 7,152,876 B2 * | 12/2006 | Hofmann | 280/743.1 |
| 7,195,280 B2 | 3/2007 | Wheelwright et al. | |

(Continued)

FOREIGN PATENT DOCUMENTS
EP 1508486 6/2009
(Continued)

OTHER PUBLICATIONS
Restriction Requirement mailed Dec. 27, 2010 in co-pending U.S. Appl. No. 12/552,878.
(Continued)

*Primary Examiner* — Paul N Dickson
*Assistant Examiner* — James English
(74) *Attorney, Agent, or Firm* — Sally J. Brown; Stoel Rives LLP

(57) ABSTRACT

During the manufacture of an inflatable airbag cushion, an inflator may be inserted into, and coupled to, a throat portion of the inflatable airbag cushion. This process may be achieved more quickly and with higher reproducibility of the placement of the inflator within the throat portion by forming an assembly aid in the throat portion of the cushion. The assembly aid functions to assist in the separation of the two panels of material from which the throat portion is manufactured. The separation can be achieved by forming one or more pleats, tabs, or loops in the throat portion near an inflator insert aperture. A throat liner may optionally be used within an airbag throat portion, in which case the assembly aid may also be formed in the throat liner.

8 Claims, 7 Drawing Sheets

U.S. PATENT DOCUMENTS

| | | | |
|---|---|---|---|
| 7,213,839 B2 * | 5/2007 | Lockwood | 280/743.2 |
| 7,243,941 B2 | 7/2007 | Charpentier et al. | |
| 7,396,042 B2 * | 7/2008 | Mabuchi et al. | 280/730.2 |
| 7,404,572 B2 * | 7/2008 | Salmo et al. | 280/729 |
| 7,677,595 B2 | 3/2010 | Dominissini et al. | |
| 7,699,340 B2 | 4/2010 | Okuhara et al. | |
| 7,789,414 B2 | 9/2010 | Blackburn | |
| 7,883,112 B2 | 2/2011 | Wold et al. | |
| 2003/0090093 A1 | 5/2003 | Ikeda et al. | |
| 2003/0132615 A1 | 7/2003 | Henderson | |
| 2004/0150202 A1 | 8/2004 | Goto | |
| 2005/0001415 A1 * | 1/2005 | Charpentier et al. | 280/740 |
| 2005/0134022 A1 | 6/2005 | Noguchi et al. | |
| 2006/0108777 A1 * | 5/2006 | Mabuchi et al. | 280/730.2 |
| 2006/0108778 A1 | 5/2006 | Ochiai et al. | |
| 2006/0244244 A1 | 11/2006 | Blackburn | |
| 2009/0039627 A1 | 2/2009 | Yokota | |
| 2009/0134607 A1 | 5/2009 | Okuhara et al. | |
| 2010/0207368 A1 * | 8/2010 | Weyrich | 280/736 |
| 2010/0253055 A1 | 10/2010 | Schneider et al. | |
| 2011/0049848 A1 | 3/2011 | Walston et al. | |

FOREIGN PATENT DOCUMENTS

| | | |
|---|---|---|
| JP | 2005104176 | 4/2005 |
| WO | WO-2011/028684 | 3/2011 |

OTHER PUBLICATIONS

Notification of Transmittal of the International Search Report and the Written Opinion of the International Searching Authority issued Oct. 28, 2010 in International Application No. PCT/US2010/047250.

Co-pending U.S. Appl. No. 12/552,878, titled Integrated Airbag Closing and Inflator Mounting Members for Inflatable Airbag Assemblies, filed Sep. 2, 2009.

Co-pending U.S. Appl. No. 12/683,911, titled Inflatable Airbag Assembly With an Inflator Bracket, filed Jan. 7, 2010.

Amendment and Response to Requirement of Election of Species filed Jan. 27, 2011 in co-pending U.S. Appl. No. 12/552,878, now published as U.S. Publication No. US 2011/0049848.

Office Action mailed Feb. 28, 2011 in co-pending U.S. Appl. No. 12/552,878, now published as U.S. Publication No. US 2011/0049848.

Office Action mailed Oct. 28, 2010 in co-pending U.S. Appl. No. 12/683,911.

Notification of Transmittal of the International Search Report and the Written Opinion of the International Searching Authority issued Feb. 1, 2011 in International Application No. PCT/US2011/020469.

* cited by examiner

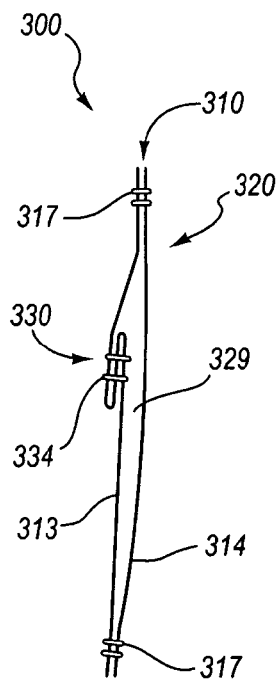
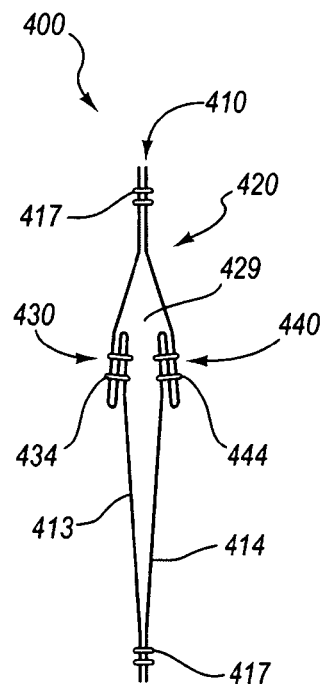
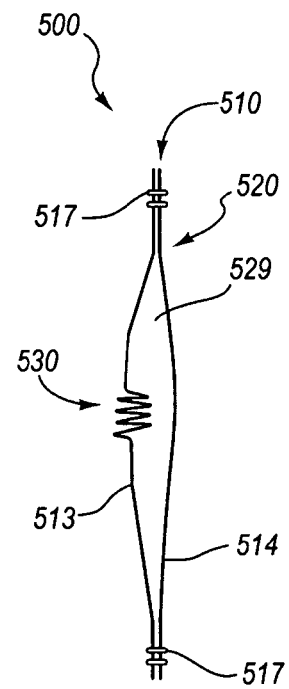
FIG. 4  FIG. 5  FIG. 6
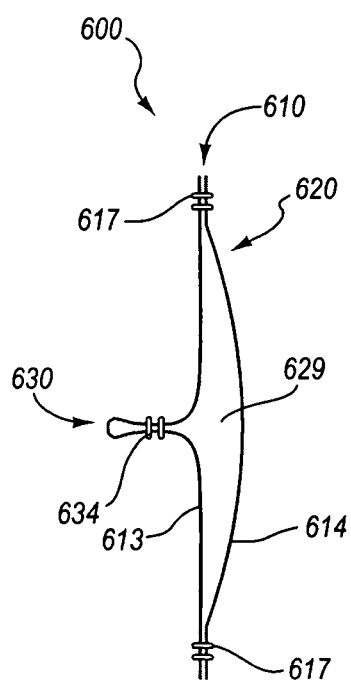
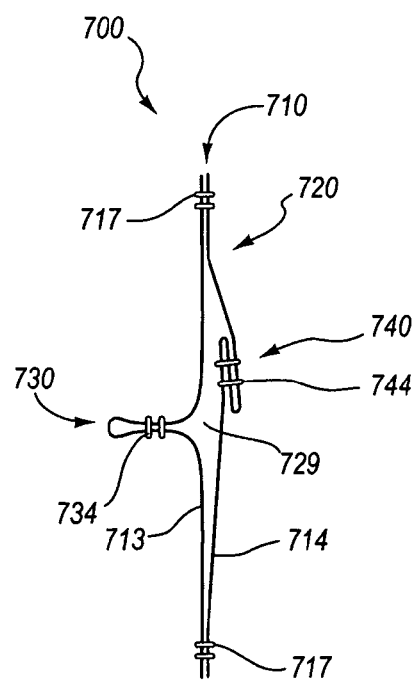
FIG. 7  FIG. 8

INFLATABLE AIRBAG CUSHION ASSEMBLIES WITH MODIFIED THROAT PORTIONS

TECHNICAL FIELD

The present disclosure relates generally to the field of automotive protective systems. More specifically, the present disclosure relates to a modified throat portion for an inflatable airbag cushion.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

FIG. 4 is a side elevation view of another embodiment of a throat portion of an inflatable airbag cushion assembly.

FIG. 5 is a side elevation view of another embodiment of a throat portion of an inflatable airbag cushion assembly.

FIG. 6 is a side elevation view of another embodiment of a throat portion of an inflatable airbag cushion assembly.

FIG. 7 is a side elevation view of another embodiment of a throat portion of an inflatable airbag cushion assembly.

FIG. 8 is a side elevation view of another embodiment of a throat portion of an inflatable airbag cushion assembly.

DETAILED DESCRIPTION OF PREFERRED EMBODIMENTS

Figure 1:
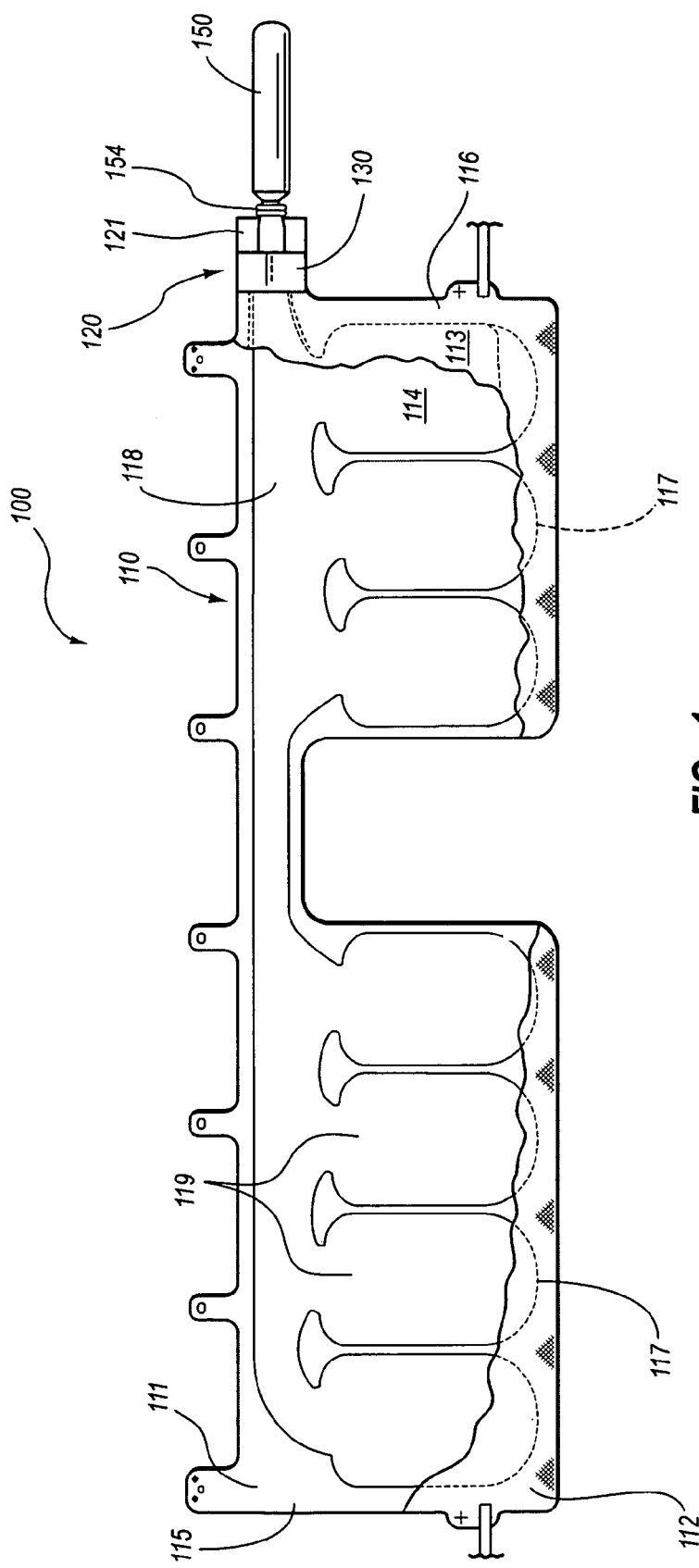
FIG. 1 is a front elevation view of one embodiment of an inflatable airbag cushion assembly.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

Inflatable curtain airbags may be used to protect the passengers of a vehicle during a side collision or roll-over collision. Inflatable curtain airbags typically extend longitudinally within the vehicle and are usually coupled to or next to the roof rail of the vehicle. The inflatable curtain airbag may expand in a collision scenario along the side of the vehicle between the vehicle passengers and the side structure of the vehicle. In a deployed state, an inflatable curtain airbag may cover at least a portion of the side windows and the B-pillar of the vehicle. In some embodiments, inflatable curtain airbags may extend from the A-pillar to the C-pillar of the vehicle. In alternative embodiments, inflatable curtain airbags may extend from the A-pillar to the D-pillar of the vehicle.

Inflatable curtain airbags are typically installed adjacent the roof rail of a vehicle in an undeployed state, in which the inflatable curtain airbag is rolled or folded or a combination thereof and retained in the folded or rolled configuration by being wrapped at certain points along the airbag, or alternatively, the airbag may be retained within a sock. When deployed, the airbag exits the undeployed, folded or rolled state and assumes an extended shape. Thus, an airbag mounting apparatus typically allows for a secure connection between the vehicle and the airbag, yet allows the airbag to change configurations from undeployed/rolled/folded to deployed/extended.

Conventionally, inflatable curtain airbags include attachment tabs at the top edge and at various locations along the longitudinal length of the inflatable curtain airbag. During a conventional installation, bolts or other fasteners are used to attach each attachment tab to the roof rail or similar structure of the vehicle, often with the aid of a mounting bracket.

FIG. 1 depicts airbag assembly 100 from a front elevation view. Airbag assembly 100 may comprise an inflatable cushion membrane 110 and an inflator 150. Inflatable curtain cushion 110 may be configured to fit within the side window wells of a vehicle and function as a side curtain airbag. Cushion 110 may comprise a contiguous piece of material manufactured using a one-piece woven technique or may be manufactured via a cut, sew, and seal technique, wherein one or more pieces of a nylon material are used to form the cushion. Cushion 110 may be anchored to a vehicle structure via mounting tabs disposed on the outer edge of cushion 110 and by tethers, which may be coupled to cushion 110 by sewing, gluing, RF welding or by any other suitable technique. The tethers may comprise extensions of cushion 110 and may be anchored to vehicle structures, such as an A-pillar and a D-Pillar.

According to the embodiment depicted in FIG. 1, cushion 110 has an upper portion 111, a lower portion 112, a front face 113, a rear face 114, a first end 115, and a second end 116. The front and rear panels 113 and 114 may be coupled together at a seam that is formed by stitching 117, wherein the stitching defines an inflatable void 118. Stitching 117 may further divide inflatable void 118 into inflation cells 119. Inflation cells 119 are configured to receive inflation gas from inflator 150 and thereby cushion an occupant in a collision or rollover event. The shapes of inflation cells 119, as depicted in FIG. 1, are strictly for illustrative purposes and may vary according to vehicle application.

Upper portion 111 of cushion 110 is the portion of the cushion that is closest to the headliner of a vehicle when the cushion is in a deployed state. Lower portion 112 is below upper portion 111 when cushion 110 is in a deployed state, and is closest to a floor of the vehicle. The term "lower portion" is not necessarily limited to the portion of cushion 110 that is below a horizontal medial plane of the cushion, but may include less than half, more than half or exactly half of the bottom portion of the cushion. Likewise, the term "upper portion" is not necessarily limited to the portion of cushion 110 that is above a horizontal medial plane of the cushion, but may include less than half, more than half or exactly half of the top portion of the cushion.

Throat portion 120 is located on upper portion 111 of second side 116 and comprises an extension of inflatable void 118 that is configured to fluidly couple inflator 150 to the inflatable void and inflation cells 119. Throat portion 120 comprises a distal portion 121, which comprises an assembly aid 130. In the depicted embodiment, inflatable cushion 110 comprises one throat portion; however, in alternative embodiments the cushion may comprise more than one throat portion. Throat portion 120 is also configured to be fluidly coupled to inflator 150. Inflator 150 may be partially inserted into the inflatable void of throat 120, or alternatively, an inflator extension, inflator diffuser, and/or inflator tube, may be inserted into the throat.

Inflator 150 may be anchored to a roof rail in a vehicle, and may comprise a pyrotechnic device, a stored gas inflator, or a combination of the two. Inflator 150 may be fluidly coupled to throat portion 120 via a coupler 154, which may comprise an integral member of the inflator or may comprise a member that is separate from the inflator, but is configured to be coupled to the inflator. As such, the inflator may be said to comprise a coupler. One example of a coupler that may be employed is a Bandit ring coupler, which is well known in the art. Inflator 150 is in electronic communication with one or more vehicle sensors which are configured to detect a collision or rollover event. Upon detection of predetermined conditions, the sensors activate the inflator and inflatable curtain cushion 110 is rapidly inflated, thereby changing configurations from a packaged state to an extended state.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations within a vehicle such that the cushion may comprise an inflatable curtain cushion; a rear passenger side airbag; a driver's airbag; and/or a front passenger airbag. Also, the cushion membrane may comprise one or more materials that are well known in the art, such as a woven nylon fabric. The airbag cushion may be manufactured using a combination of one-piece weaving and cut, sew, and seal techniques. Further, the cushion membrane may be manufactured using sealed or unsealed seams, wherein the seams are formed by stitching, adhesive, taping, radio frequency welding, heat sealing, or any other suitable technique or combination of techniques.

Figure 2A:
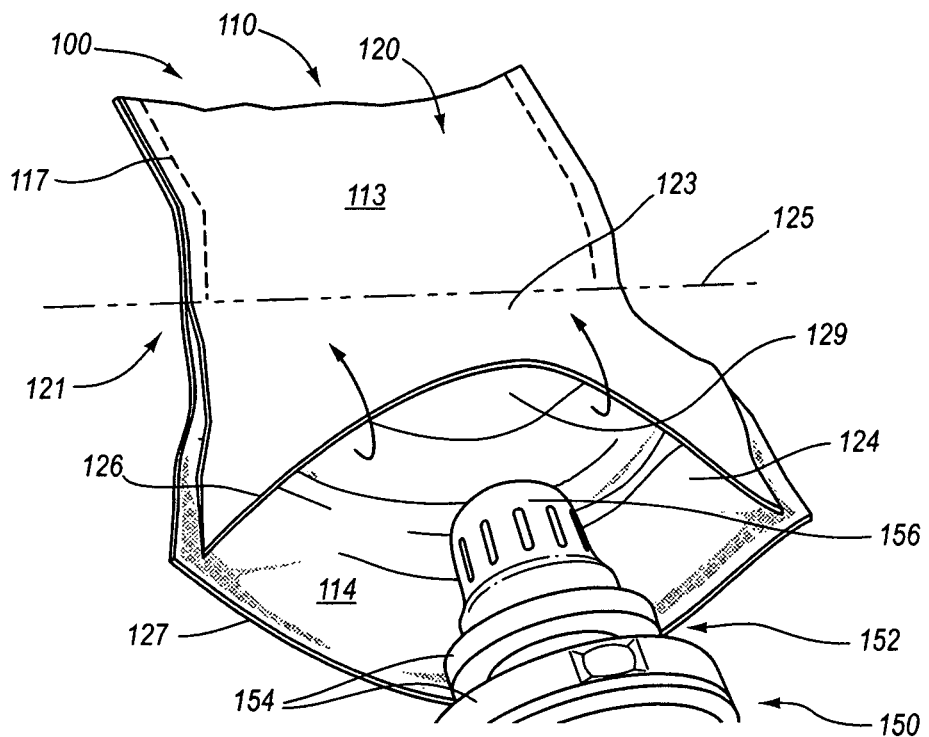
FIG. 2A is a close up cutaway perspective view of the inflatable airbag cushion assembly of FIG. 1 before a throat portion has been modified.
Figure 2B:
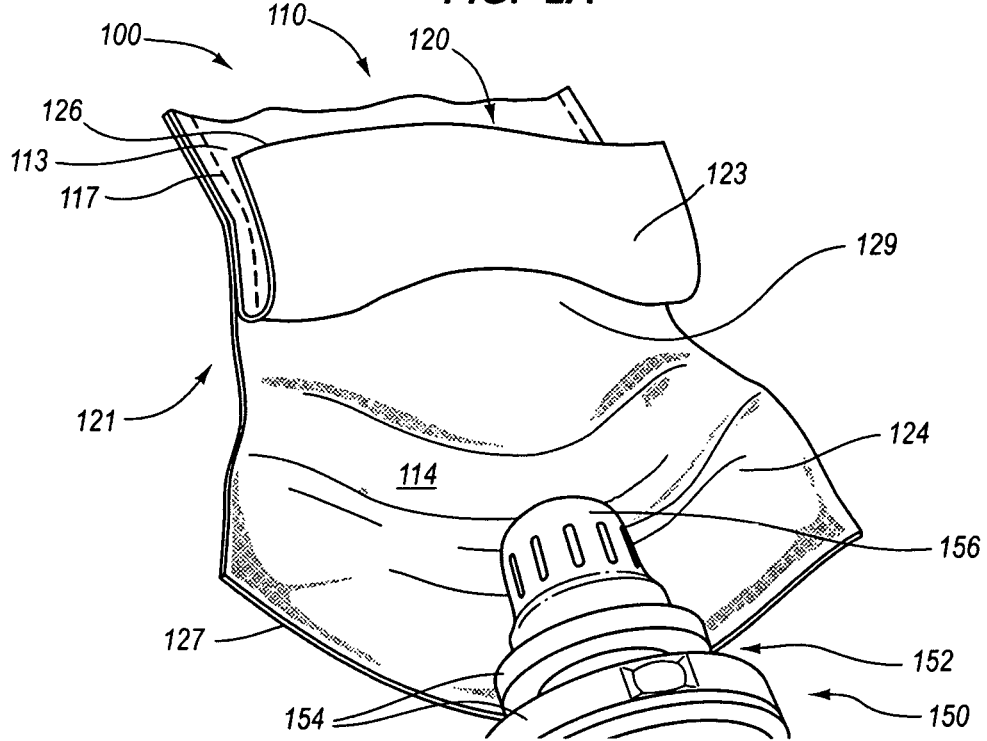
FIG. 2B is a close up cutaway perspective view of the inflatable airbag cushion assembly of FIG. 2A after a portion of the throat portion has been folded.
Figure 2C:
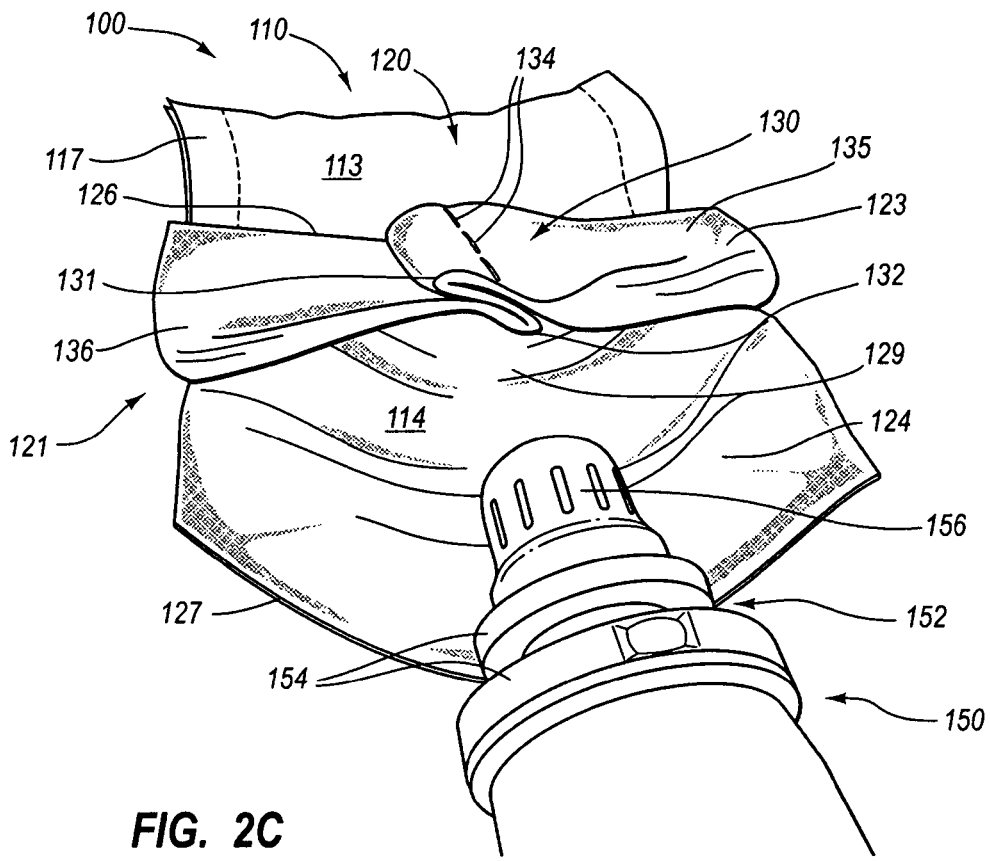
FIG. 2C is a close up cutaway perspective view of the inflatable airbag cushion assembly of FIG. 2B after a pleat has been formed in the folded portion of the throat portion.

FIGS. 2A-2C are close up cutaway perspective views of throat portion 120 of cushion 110 of inflatable airbag cushion assembly 100, wherein the figures illustrate manipulation of the throat portion to form an assembly aid. As depicted in FIGS. 2A-2C, assembly 100 comprises airbag cushion 110 and inflator 150. Cushion 110 has a throat portion 120 that comprises a front panel of material 113 and a rear panel of material 114, wherein the two panels of material are coupled together via stitching 117. Front and rear panels 113 and 114 define an aperture 129 that is contiguous with the inflatable void of cushion 110, wherein the aperture is configured to receive inflator 150. Front and rear panels may also be called first and second panels. Throat portion 120 extends to a distal portion 121 that has a front panel extension 123 and a rear panel extension 124; the front and rear panel extensions may be defined as starting from a distal limit 125 of stitching 117 such that the extensions are not coupled together. Front and rear panel extensions 123 and 124 have distal edges 126 and 127.

Inflator 150 comprises a cushion-proximal end 152, wherein the cushion-proximal end has a coupler 154 and an inflator tube 156. As described above, coupler 154 may comprise a portion of inflator 150 or may comprise a separate member. Inflator tube 156 is configured to extend through aperture 129 and into the inflatable void of cushion 110. Inflator tube 156 may be configured as tubular extension that has a single aperture through which inflation gas can exit into the inflatable void. In another embodiment, the inflator tube may comprise a plurality of inflation gas exit apertures. In other embodiments, the inflator tube comprises an extended inflator tube with a diffuser, or a diffuser without an extended inflator tube.

FIG. 2A depicts distal portion 121 before front panel extension 123 has been configured as an assembly aid. As described above, extension 123 is not coupled to extension 124, and as such, extension 123 can be folded toward front panel 113 such that distal edge 126 of the front panel is directed away from distal portion 121 of throat 120. The fold may be made along the line that represents the distal extent of stitching 117, such that throat 120 is configured as depicted in FIG. 2B.

Once throat 120 is manipulated into the configuration depicted in FIG. 2B, front panel extension 123 can be configured as an assembly aid by forming a pleat in the folded front panel extension. Assembly aid 130 is depicted in FIG. 2C, and may be formed by pleating the folded front panel extension 123. It may also be said that assembly aid 130 can be formed by folding the folded front panel extension upon itself such that a first fold 131 and a second fold 132 are formed. The pleat may be retained via a fastener 134, which in the depicted embodiment comprises stitching 134. In other embodiments, fastener 134 may comprise any suitable structure or technique such as stapling, riveting, gluing, RF welding, and/or employing clips. In the depicted embodiment, fastener 134 is depicted as having an orientation that is horizontal when cushion 110 is mounted in a vehicle and in an extended configuration.

First and second end portions 135 and 136 may be coupled to layers of throat portion 120 that are adjacent to assembly aid 130, such as front and rear panels 113 and 114. In the depicted embodiment, a throat liner is not depicted; however in other embodiments, a throat liner may be employed and may partially form an assembly aid or may solely form an assembly aid. The orientation of the pleat or folds of assembly aid 130 as depicted in FIG. 2C is strictly for exemplary purposes. Various orientations and configurations of folds, loops, and/or pleats may be formed in a throat portion or a throat liner to form an assembly aid, some of which are illustrated herein.

Once assembly aid 130 is formed in throat portion 120, inflator insert aperture 129 may be more defined, since front panel 113 has been shortened relative to rear panel 114. Additionally, assembly aid 130 may allow front panel 113 and rear panel 114 to be more readily identified and distinguished. During assembly of cushion 110 and coupling of inflator 150 to cushion 110, assembly aid 130 may allow front and rear panels 113 and 114 to be more readily separated. Also, when inflator 150 is coupled to cushion 110, assembly aid 130 may allow the inflator to be more consistently oriented within throat portion 120.

Figure 3:
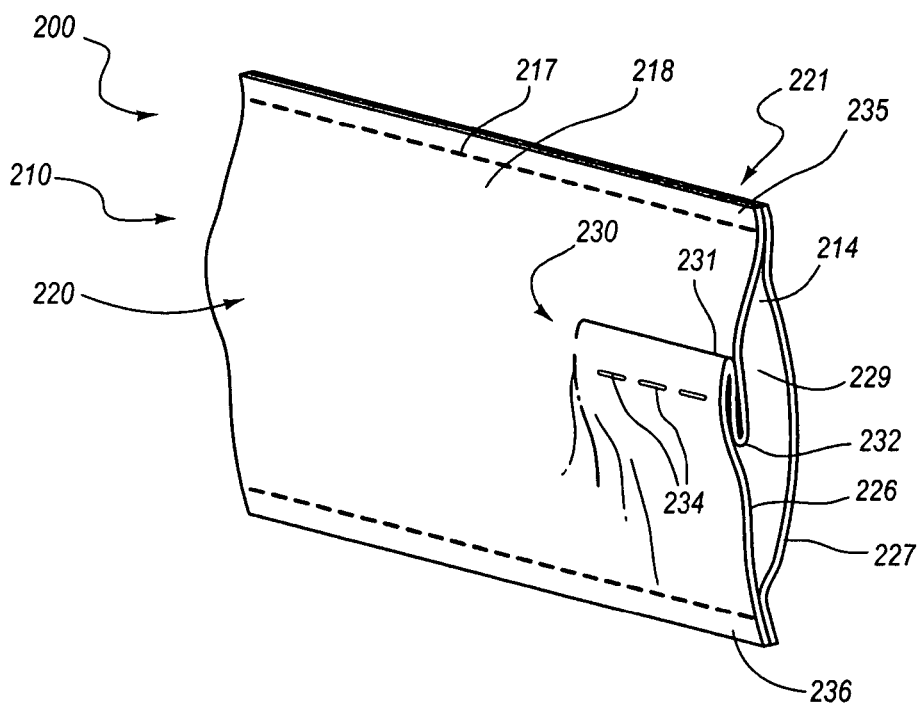
FIG. 3 is a close up cutaway perspective view of the inflatable airbag cushion assembly of FIG. 2C.

FIG. 3 depicts a portion of another embodiment of an airbag assembly 200 from a close up cutaway perspective view. Assembly 200 may be configured similarly to and may function similarly as airbag assemblies 100, described herein. Inflatable airbag cushion 210 may comprise an inflatable curtain cushion, a knee airbag, a side airbag, or any other airbag configuration that has a throat portion. Cushion 210 and throat portion 220 comprise an inflatable void 218 that is formed by coupling a front panel 213 to a rear panel 214. Front and rear panels 213 and 214 may be coupled at a seam 217 that may be formed by stitching 217, wherein the seam may define the inflatable void. A distal end 221 of throat 220 comprises an aperture 229 that is in fluid communication with inflatable void 218, wherein the aperture may be defined by distal edges 226 and 227 of front and rear panels 213 and 214.

Cushion throat 220 does not have extensions, such as those of throat 120. As such, assembly aid 230 may be said to be formed within front panel 213 such that the assembly aid 230 does not extend significantly beyond seam 217. Assembly aid 230 may be formed as assembly aid 130, as described herein. First and second folds 231 and 232 may be retained via a fastener 234, which is depicted in FIG. 3 as stitching.

Assembly aid 230 may shorten an effective length from first portion 235 and second portion 236 of front panel 213 at distal end 221. As such the effective length of front panel 213 at assembly aid 230 may be shorter when compared to a length of front panel 213 as measured at a portion of throat 220 that does not have an assembly aid formed in it, and compared to a length of rear panel 214. In the depiction of FIG. 3, throat 220 is rectangular, and therefore, the assembly aid may alter the length of the panel in which the assembly aid is formed, as described above. In alternative embodiments, the throat portion of an inflatable cushion may not be rectangular, symmetrical, or comprise parallel edges or end portions, such that forming an assembly aid in one panel of the throat may or may not alter the effective length of that portion of the panel in relation to other portions of the panel or other panels, as described above.

FIGS. 4-8 depict various embodiments of inflatable airbag assemblies 300, 400, 500, 600, and 700, wherein various embodiments of assembly aids have been formed in cushions 310, 410, 510, 610, and 710. The inflatable airbag assemblies, cushions, and assembly aids depicted in FIGS. 4-8 may be configured similarly and may function similarly as those depicted in FIGS. 1-3.

FIG. 4 depicts a portion of inflatable airbag assembly 300 from a front elevation view. Inflatable airbag assembly 300 may comprise an inflatable airbag cushion 310 that has a throat portion 320, which is formed by a front panel 313 and a rear panel 314. Front and rear panels 313 and 314 may be coupled together at a seam 317, which defines an inflatable void that is in fluid communication with an inflator insert aperture 329. Assembly aid 330 is depicted as being configured similarly as assembly aids 130 and 230, except that assembly aid 330 is not centered on panel 313. Assembly aid 330 may be formed in panel 313 similarly as described herein for other assembly aids. Assembly aid 330 may be retained in panel 313 via a fastener 334. As depicted in FIG. 5, the assembly aids of this disclosure may be formed in a front and/or rear panel of an inflatable airbag cushion.

FIG. 5 depicts a portion of inflatable airbag assembly 400 from a front elevation view. Inflatable airbag assembly 400 may comprise an inflatable airbag cushion 410 that has a throat portion 420, which is formed by a front panel 413 and a rear panel 414. Front and rear panels 413 and 414 may be coupled together at a seam 417, which defines an inflatable void that is in fluid communication with an inflator insert aperture 429. Assembly aid 430 is depicted as being configured similarly as assembly aid 330, depicted in FIG. 4, except that assembly aid 430 comprises a first aid 430 and a second aid 440. First aid 430 is formed in front panel 413 and second aid 440 is formed in panel 414. First and second assembly aids 430 and 440 may be said to comprise a single assembly aid 430 that has two portions. First and second aids 430 and 440 may be formed in panels 413 and 414 in a manner that is similar to other assembly aids disclosed herein. Assembly aids 430 and 440 may be retained in panel 413 via fasteners 434 and 444.

FIG. 6 depicts a portion of inflatable airbag assembly 500 from a front elevation view. Inflatable airbag assembly 500 may comprise an inflatable airbag cushion 510 that has a throat portion 520, which is formed by a front panel 513 and a rear panel 514. Front and rear panels 513 and 514 may be coupled together at a seam 517, which defines an inflatable void that is in fluid communication with an inflator insert aperture 529. Assembly aid 530 is configured to function similarly as other assembly aids disclosed herein. In the depicted embodiment, front panel 513 comprises a piece of material, which at the throat portion, has a height that is of greater magnitude than the height of rear panel 514. Because front and rear panels 513 and 514 are coupled together near their edges at seam 517, the front panel may have slack, or wrinkles in it. The use of panels of material with different heights at the throat portion and the resulting pleats, wrinkles, slack, folds, or any combination of these, comprise assembly aid 530.

FIG. 7 depicts a portion of inflatable airbag assembly 600 from a front elevation view. Inflatable airbag assembly 600 may comprise an inflatable airbag cushion 610 that has a throat portion 620, which is formed by a front panel 613 and a rear panel 614. Front and rear panels 613 and 614 may be coupled together at a seam 617, which defines an inflatable void that is in fluid communication with an inflator insert aperture 629. Assembly aid 630 is formed in front panel 613 and may be retained in the front panel via a fastener 634. Assembly aid 630 is configured to function similarly as other assembly aids disclosed herein. Also, assembly aid 630 may be formed in panels 613 and 614 in a manner that is similar to other assembly aids disclosed herein.

FIG. 8 illustrates that combinations of the assembly aids of the present disclosure may be combined in a single throat portion of an inflatable airbag cushion. FIG. 8 depicts a portion of inflatable airbag assembly 700 from a front elevation view. Inflatable airbag assembly 700 may comprise an inflatable airbag cushion 710 that has a throat portion 720, which is formed by a front panel 713 and a rear panel 714. Front and rear panels 713 and 714 may be coupled together at a seam 717, which defines an inflatable void that is in fluid communication with an inflator insert aperture 729. First assembly aid 730 is formed in front panel 713 and second assembly aid 740 is formed in rear panel 714. Aids 730 and 740 may be retained in the front panel via fasteners 734 and 744. Assembly aids 730 and 740 are configured to function similarly as other assembly aids disclosed herein. Also, assembly aids 730 and 740 may be formed in panels 713 and 714 in a manner that is similar to other assembly aids disclosed herein.

Figure 9:
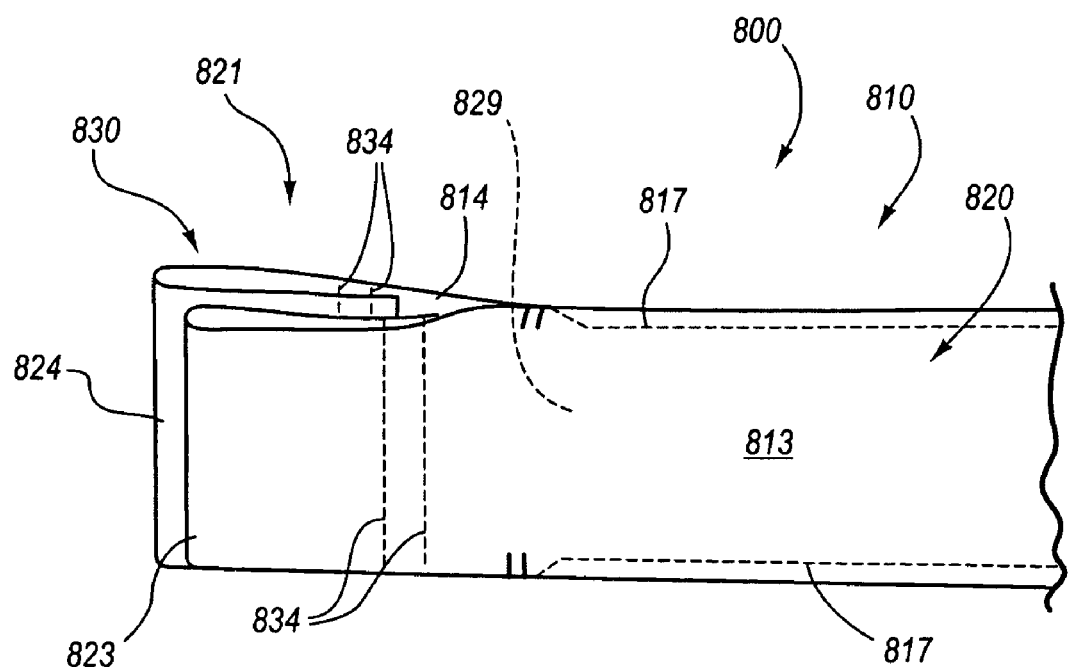
FIG. 9 is a close up cutaway perspective view of another embodiment of a throat portion of an inflatable airbag cushion assembly.

FIG. 9 depicts another embodiment of an inflatable airbag cushion assembly 800 from a cutaway perspective view. Airbag assembly 800 may be configured similarly as, and may function similarly to, airbag assemblies 100-700, as disclosed herein. Cushion 810 may comprise a throat portion 820 that has a front panel of material 813 and a rear panel of material 814, wherein the panels of material are coupled together at a seam 817, which is depicted as stitching. Front and rear panels 814 and 815 may form an inflatable void that is in fluid communication with an inflator insert aperture 829, wherein the inflatable void and the aperture may be defined by seam 817.

Assembly aid 830 as well as aperture 829 may be described as being at a distal portion 821 of throat 820. Assembly aid 830 may comprise front and rear panel extensions 823 and 824, wherein the assembly aid functions similarly as, and may be formed in a manner similar to assembly aid 130, as well as other assembly aids disclosed herein. Front and rear panel extensions 823 and 824 may extend distally beyond seam 817. Assembly aid 830 may be formed by folding each of the front and rear panel extensions 823 and 824 toward inflator insert aperture 829. The front and rear panel extensions 823 and 824 may be retained in the folded configuration by applying a fastener 834, which is depicted in FIG. 9 as stitching. One skilled in the art will recognize that the folds of the front and rear panel extensions may be formed such that the folds run approximately parallel with the long axis of the throat portion, rather than perpendicular to the long axis of the throat portion, as depicted in FIG. 9.

Figure 10:
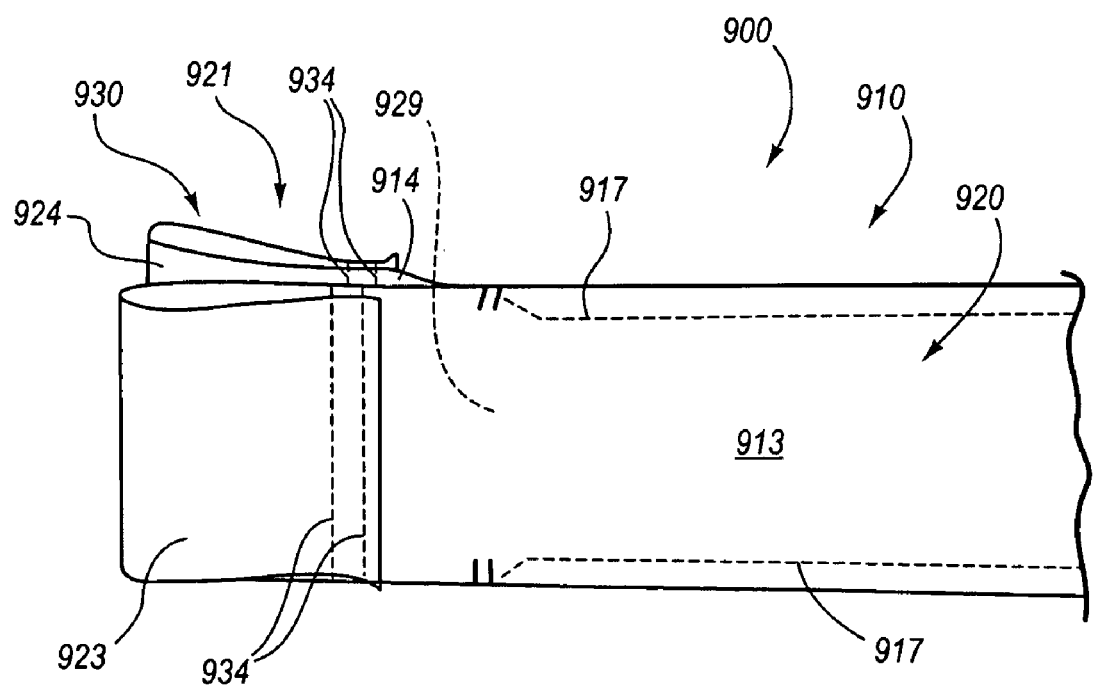
FIG. 10 is a close up cutaway perspective view of another embodiment of a throat portion of an inflatable airbag cushion assembly.

FIG. 10 depicts another embodiment of an inflatable airbag cushion assembly 900 from a cutaway perspective view. Airbag assembly 900 may be configured similarly as, and may function similarly to, airbag assemblies 100-700, as disclosed herein. Cushion 910 may comprise a throat portion 920 that has a front panel of material 913 and a rear panel of material 914, wherein the panels of material are coupled together at a seam 917, which is depicted as stitching. Front and rear panels 914 and 915 may form an inflatable void that is in fluid communication with an inflator insert aperture 929, wherein the inflatable void and the aperture may be defined by seam 917.

Assembly aid 930 as well as aperture 929 may be described as being at a distal portion 921 of throat 920. Assembly aid 930 may comprise front and rear panel extensions 923 and 924, wherein the assembly aid functions similarly as, and may be formed in a manner similar to assembly aids 130 and 830, as well as other assembly aids disclosed herein. Front and rear panel extensions 923 and 924 may extend distally beyond seam 917. Assembly aid 930 may be formed by folding each of the front and rear panel extensions 923 and 924 outwardly away from inflator insert aperture 829 and toward the front and rear panels 913 and 914, respectively. The front and rear panel extensions 923 and 924 may be retained in the folded configuration by applying a fastener 934, which is depicted in FIG. 10 as stitching. One skilled in the art will recognize that the folds of the front and rear panel extensions may be formed such that the folds run approximately parallel with the long axis of the throat portion, rather than perpendicular to the long axis of the throat portion, as depicted in FIG. 10.

Figure 11:
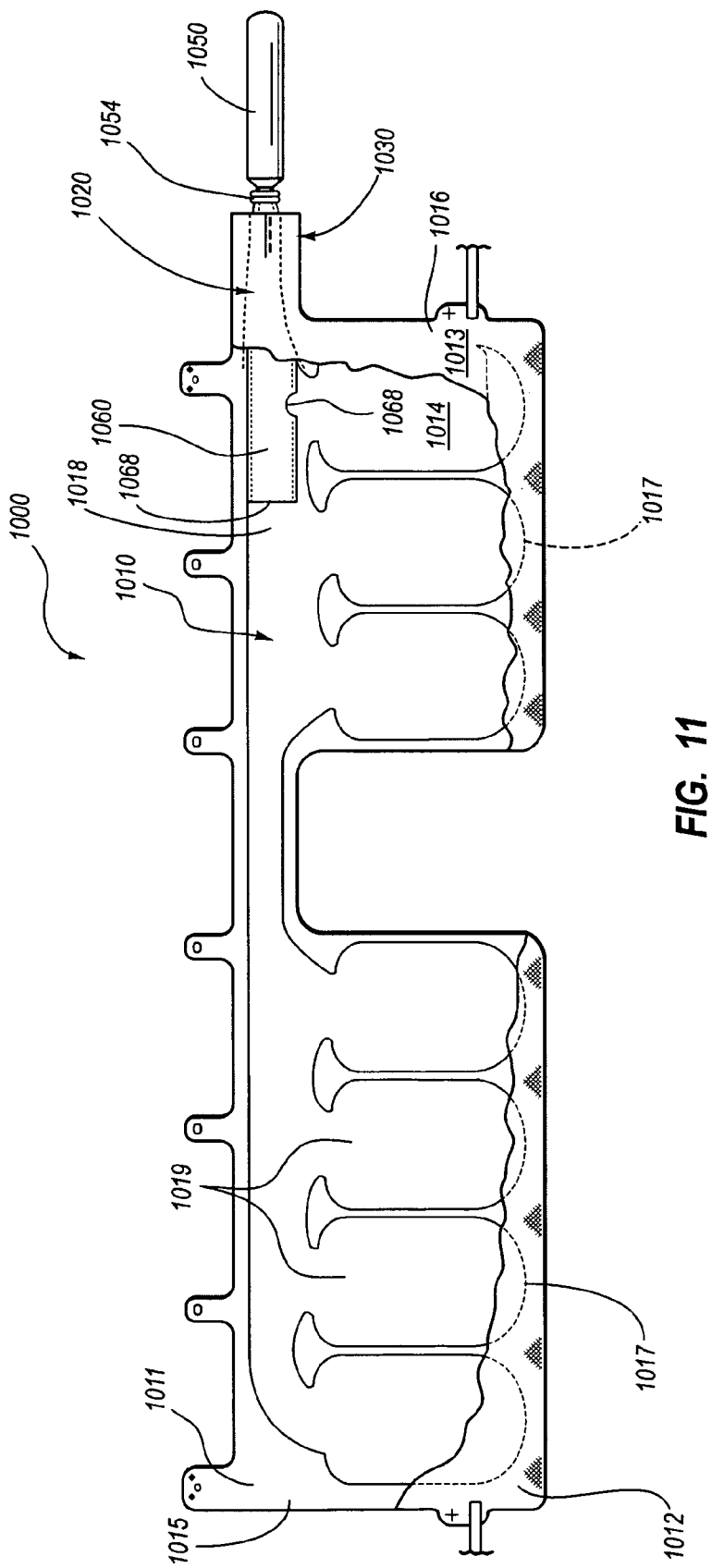
FIG. 11 is a side elevation view of another embodiment of a throat portion of an inflatable airbag cushion assembly.
Figure 12:
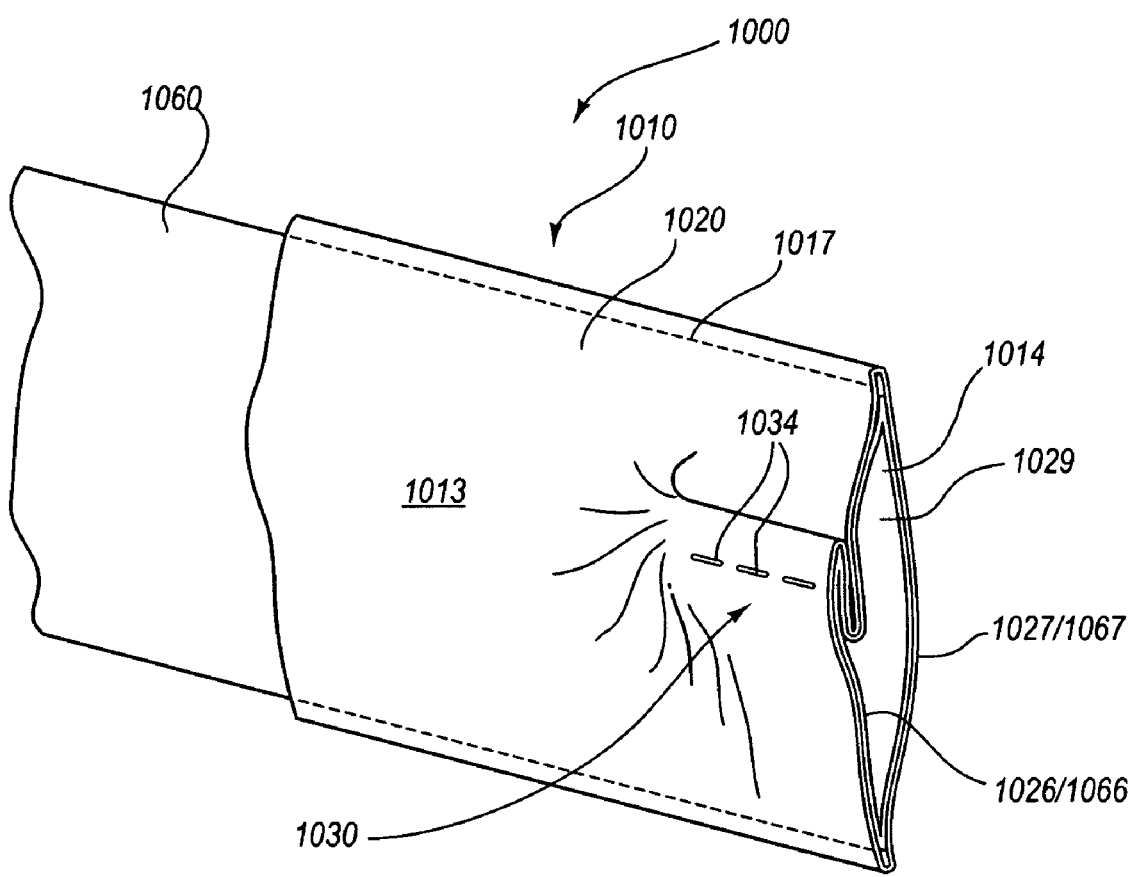
FIG. 12 is a close up cutaway perspective view the inflatable airbag cushion assembly of FIG. 11.

FIGS. 11 and 12 depict another embodiment of an inflatable airbag cushion assembly 1000, wherein the assembly comprises an inflatable airbag cushion 1010, an inflator 1050 and a throat liner 1060. Airbag assembly 1000 may be configured similarly and may function similarly as other airbag assemblies disclosed herein.

According to the embodiment depicted in FIG. 11, cushion 1010 has an upper portion 1011 a lower portion 1012, a front face 1013, a rear face 1014, a first end 1015, and a second end 1016. The front and rear panels 1013 and 1014 may be coupled together at a seam that is formed by stitching 1017, wherein the stitching defines an inflatable void 1018. Stitching 1017 may further divide Inflatable void 1018 into inflation cells 1019. Inflation cells 1019 are configured to receive inflation gas from inflator 1050 and thereby cushion an occupant in a collision or roll-over event. The shapes of inflation cells 1019 as depicted in FIG. 11 are strictly for illustrative purposes and may vary according to vehicle application.

Upper portion 1011 of cushion 1010 is the portion of the cushion that is closest to the headliner of a vehicle when the cushion is in a deployed state. Lower portion 1012 is below upper portion 1011 when cushion 1010 is in a deployed state, and is closest to a floor of the vehicle. The term "lower portion" is not necessarily limited to the portion of cushion 1010 that is below a horizontal medial plane of the cushion, but may include less than half, more than half or exactly half of the bottom portion of the cushion. Likewise, the term "upper portion" is not necessarily limited to the portion of cushion 1010 that is above a horizontal medial plane of the cushion, but may include less than half, more than half or exactly half of the top portion of the cushion.

Throat portion 1020 is located on upper portion 1011 of second side 1016 and comprises an extension of inflatable void 1018 that is configured to fluidly couple inflator 1050 to the inflatable void and inflation cells 1019. Throat portion comprises a distal portion 1021, which comprises an assembly aid 1030. In the depicted embodiment, inflatable cushion 1010 comprises one throat portion; however, in alternative embodiments the cushion may comprise more than one throat portion. Throat portion 1020 is also configured to be fluidly coupled to inflator 1050. Inflator 1050 may be partially inserted into the inflatable void of throat 1020, or alternatively, an inflator extension, inflator diffuser, and/or inflator tube, may be inserted into the throat.

Inflator 1050 may be anchored to a roof rail in a vehicle, and may comprise a pyrotechnic device, a stored gas inflator, or a combination of the two. Inflator 1050 may be fluidly coupled to throat portion 1020 via a coupler 1054, which may comprise an integral member of the inflator or may comprise a member that is separate from the inflator, but is configured to be coupled to the inflator. As such, the inflator may be said to comprise a coupler.

Throat liner 1060 may comprise a separate member than cushion 1010 and may be coupled to the cushion, or alternatively, throat liner 1060 may be integral to cushion 1010 such that it does not comprise a separate member. Throat liner 1060 has a distal portion 1061 that may be located adjacent to inflator 1050. Liner 1060 may be coupled to cushion 1010 via stitching and/or inflator coupler 1054. Further, throat liner 1060 may comprise one or more inflation gas exit apertures 1068.

Assembly aid 1030 may be formed in distal portions 1021 and 1061 of throat portion 1020 and throat liner 1060. Assembly aid 1030 may be configured similarly and may function similarly as other assembly aids disclosed herein. Assembly aid 1030 may comprise one or more folds or pleats of cushion 1010 throat portion 1030 and throat liner 1060. The folds or pleats may be formed such that they are approximately parallel with a long axis of cushion 1010.

FIG. 12 is a close up cutaway perspective view of airbag assembly 1000 before cushion 1010 and throat liner 1060 have been coupled to an inflator. Throat liner 1060 may comprise a front and rear panel of material that are coupled together in a manner similar to the construction of cushion 1010, wherein the cushion comprises a front and rear panel of material 1013 and 1014 that are coupled together at a seam 1017. As such, throat portion 1020 also comprises a front and rear panel of material that terminates in distal edges of front and rear panels 1026 and 1027. Likewise, throat liner 1060 comprises distal edges of front and rear panels 1066 and 1067. Seam 1017 and distal edges 1026/1066 and 1027/1067 define an inflator insert aperture 1029.

Assembly aid 1030 may comprise one or more folds or pleats of one or both panels of material that form each of the cushion throat and throat liner. For example, as depicted in FIG. 12, a fold or pleat has been formed in front panel 1013 of throat portion 1060 as well as the adjacent front panel of throat liner 1060. The folds of the throat portion and the throat liner to form the assembly aid may be said to coincide. The fold or pleat can be retained via a fastener 1034, which is depicted as stitching. As with other airbag assemblies disclosed herein, more than one assembly aid may be formed in the throat portion and throat liner of assembly 1000. Additionally, if more than one assembly aid is formed in the airbag cushion of airbag assembly 1000, the assembly aids may not be formed or configured identically.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the disclosure is therefore defined by the following claims.

The invention claimed is:

1. An inflatable airbag assembly, comprising:
 an inflator; and,
 an inflatable airbag cushion configured to be coupled to the inflator at a throat portion, wherein the throat portion comprises a first panel of material and a second panel of material that are coupled together at a seam such that the throat portion comprises an inflator insert aperture and,
 wherein the throat portion comprises a first fold located on an extension in the throat portion,
 wherein the extension extends beyond the seam in a direction that is proximal with respect to the inflator,
 wherein the first fold is configured such that a distal edge of the extension is directed away from the inflator insert aperture and the first fold is approximately perpendicular to a long axis of the throat portion, and
 wherein the assembly aid comprises a second fold that is formed on the same extension, and wherein the second fold is made in a direction that is perpendicular to the first fold.

2. The inflatable airbag assembly of claim 1, wherein the first fold is located on the first panel of material.

3. The inflatable airbag assembly of claim 1, wherein the first fold is located on the second panel of material.

4. The inflatable airbag assembly of claim 1, wherein the first fold is retained in a folded state via a fastener.

5. The inflatable airbag assembly of claim 4, wherein the fastener comprises stitching.

6. The inflatable airbag assembly of claim 1, wherein the first fold is configured as a pleat.

7. A method for inserting an inflator into a throat portion of an inflatable airbag cushion, comprising the steps of:
 providing an inflatable airbag cushion having a throat portion that comprises a first panel and a second panel, wherein the first and second panels are coupled together at a seam to form a void, wherein the throat portion comprises an extension of the throat portion, wherein the extension extends in a cushion-distal direction beyond the seam, and wherein an end of the throat portion comprises an inflator insert aperture;
 folding the throat portion, wherein the step of folding the throat portion comprises folding the extension such that a distal edge of the extension is directed away from the inflator insert aperture such that the fold is approximately perpendicular to a long axis of the throat portion and folding the folded extension a second time such that the second fold is made in a direction that is perpendicular to the first fold;
 applying a fastener to the folded throat portion such that the folded throat portion is retained in a folded configuration to form an assembly aid;
 providing an inflator that is configured to be coupled to the throat portion;
 grasping the folded throat portion;
 separating the first and second panels; and,
 inserting the inflator within the throat portion, wherein the inflator is located between the first and second panels via the inflator insert aperture, thereby inserting the inflator in to the void of the throat portion.

8. The method of claim 7, wherein the step of folding the throat portion comprises forming a pleat in the throat portion, wherein the pleat is adjacent to the inflator insert aperture.

* * * * *